United States Patent [19]
Seguela et al.

[11] 4,278,387
[45] Jul. 14, 1981

[54] DEVICE FOR TRANSFERRING AN INVALID FROM HIS INVALID CHAIR INTO A MOTOR VEHICLE AND CONVERSELY

[76] Inventors: Marie-Claude J. Seguela, 14, Rue de Beausejour; Rene F. Betton, 26, Rue de la Viguerie; Claude A. Gonzalez, 16, Rue de Beausejour, all of, 31650 St. Orens de Gameville, France

[21] Appl. No.: 51,242

[22] Filed: Jun. 22, 1979

[30] Foreign Application Priority Data

Jun. 22, 1978 [FR] France ............................... 78 19065

[51] Int. Cl.[3] ............................................... B60N 1/12
[52] U.S. Cl. ............................ 414/462; 280/242 WC; 280/638; 297/DIG. 4; 414/921
[58] Field of Search ............... 414/347, 352, 462, 471, 414/495, 544, 542, 921; 280/242 WC, 289 WC, 638; 297/DIG. 4

[56] References Cited

U.S. PATENT DOCUMENTS

| | | | |
|---|---|---|---|
| 3,313,429 | 4/1967 | Cole | 414/347 X |
| 3,901,527 | 8/1975 | Danziger et al. | 280/638 |
| 4,170,368 | 10/1979 | Southward et al. | 414/921 X |

FOREIGN PATENT DOCUMENTS

| | | | |
|---|---|---|---|
| 640765 | 7/1950 | United Kingdom | 414/921 |

*Primary Examiner*—Robert G. Sheridan

[57] ABSTRACT

Device for transferring an invalid from his invalid chair to a motor vehicle, and conversely, while staying on his seat, wherein the seat of the invalid chair is removably mounted on an undercarriage having two bearing back-wheels and two steering front wheels. The motor vehicle has a pair of arms which are extensible towards the outside and retractable inside of the vehicle and are also vertically movable. The arms fit into female slippers on the removable seat to effect the transfer of the seat to the vehicle.

4 Claims, 2 Drawing Figures

DEVICE FOR TRANSFERRING AN INVALID FROM HIS INVALID CHAIR INTO A MOTOR VEHICLE AND CONVERSELY

The present invention relates to a device whereby the transfer of an invalid from his invalid chair into a motor vehicle, and conversely, is enabled, while the invalid stays on his seat.

Analogous devices are already known, such as the one described in the British Pat. No. 640,765. In that patent, the seat of the invalid chair is removable from the undercarriage and can be transferred with the occupant to inside the motor vehicle after making use of a ramp consisting in a couple of rails retractable under said undercarriage. Thus, the transfer from the seat necessitates its equipment with rollers to be moved along the ramp.

Such a device makes the structure of the invlaid chair considerably heavier and does not seem to be easily managed, especially as it needs the intervention of a third party in order to move the seat on its approach ramp. Moreover, during this transfer, the occupant is in an uncomfortable position as the seat is necessarily bent. It is also to be noticed that this device may be inoperative when the motor vehicle and the invalid chair are not on the same ground level, as the ramp may then present a steep slope.

The device which is object of the present invention obviates this kind of inconvenience. The invalid chair in accordance with the present invention has a removable seat mounted on an undercarriage provided with two bearing back-wheels and two steering front-wheels; the seat transfer is operated by means of a couple of arms integral with the motor vehicle, extensible towards the outside and retractable to the inside the said vehicle and also vertically movable.

These arms can be formed of parallel telescopic slippers worked by jacks and adapted to fit with other slippers fixed to the seat.

Thus, when the seat with the invalid is put close to the motor vehicle, one only needs to bring out the telescopic slippers, to insert them in the seat slippers, to move vertically, from bottom to top, the said telescopic slippers in order to set apart the seat from the undercarriage of the invalid chair, and to push back the said slippers in order to get the seat in the vehicle. Of course, the reverse operations will be conducted to bring back the invalid on his invalid chair.

The vertical and horizontal mobility of the arms equipping the motor vehicle, due to the set of jacks, thus allows a paraplegic, for example, to execute his own transfer, which is most suitable for the increase of his independence together with the relief of his family. Then again it is to be noticed that, thanks to the arms' vertical mobility, it is possible to operate this transfer whatever the ground slope on which the invalid chair and the motor vehicle stop, may be.

More characteristics and more advantages of the invention appear hereinafter described in a specific example of an embodiment, which is merely illustrative and not to be understood as limiting the scope and underlying principles of this invention in any way.

In the drawings

Figure 1:
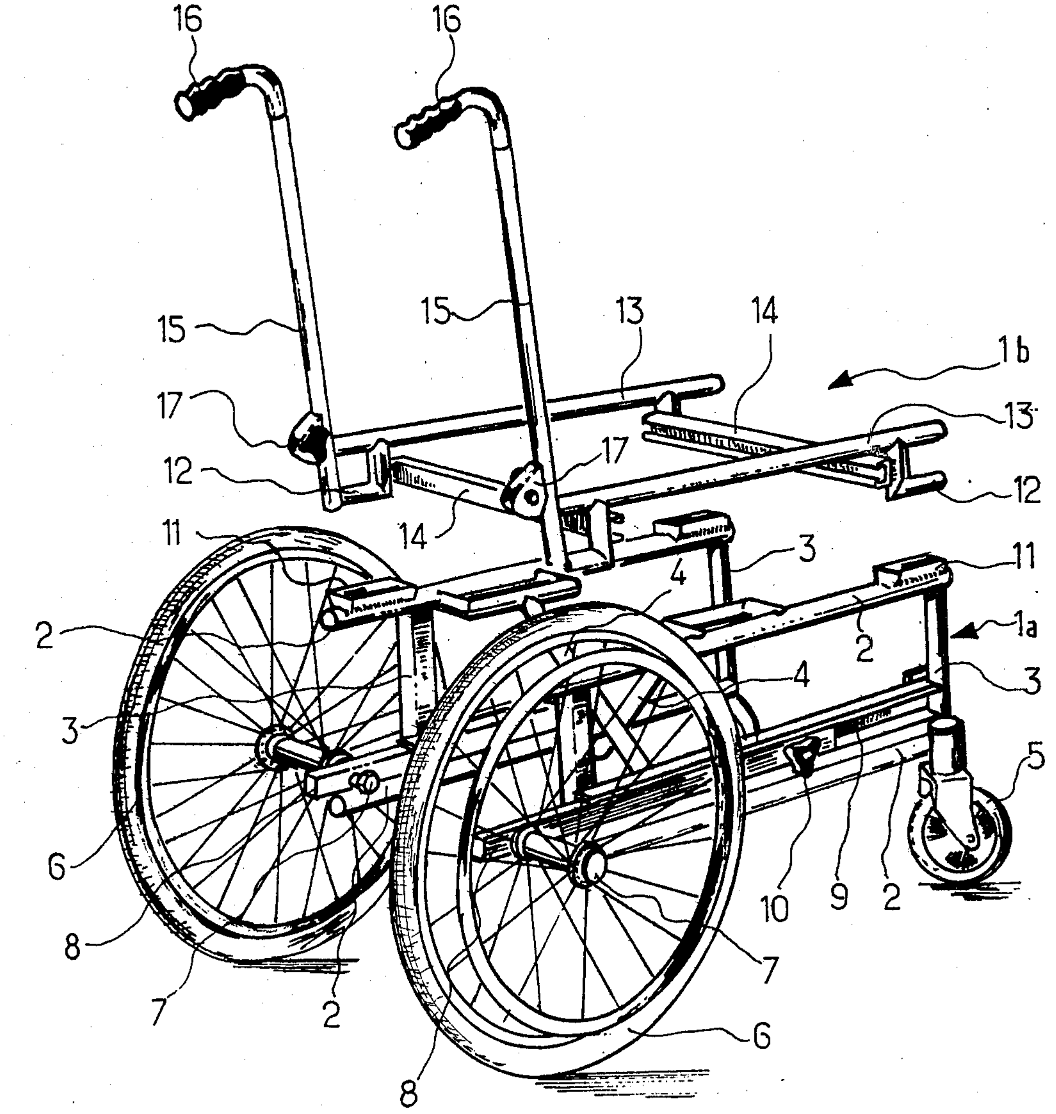
FIG. 1 is a perspective view partially cut of the invalid chair.

The invalid chair represented in FIG. 1 is made of an undercarriage 1*a* and of a removable part 1*b* constituting the frame of the seat. The said undercarriage is made of four horizontal tubular girders 2 fastened by twos in vertical and horizontal planes, respectively, by means of four vertical girders 3 and of two cross-bars 4. This undercarriage 1*a* is fitted on the one hand on two small-diametered steering front wheels 5 duly equipped with appropriate means of braking to facilitate handling during transfer and, on the other hand, on two large-diametered bearing back wheels 6. The axes of rotation of the latter are fitted at the end of extensible arms, in parallel planes with the symmetry plane of the invalid chair, and are made of two slippers 8 and 9. Stretching of said arms thus allows to move the back wheels away so that the don't interfere with transversal sliding motion of seat 1*b* when transferring said seat into the motor vehicle, as explained hereinafter. Moreover, mobility of axes 7 allows advantageous displacement of the centre of gravity of the chair and, consequently, gives a much better stability of said chair on the bearing surface, especially when used in position of relaxation with its back tilted.

It is to be noticed that locks 10 are disposed on slippers 8 in order to jam said slippers in a predetermined position.

Hemicylindral guides 11 are joined to each end of the two horizontal upper girders. These guides are intended to house four tubular elements 12 integral with the frame of the movable seat 1*b*. Of course, appropriate means of fixation which have not been represented—e.g. jointing rivets—are provided to hold elements 12 in their housing during the common utilization of the invalid chair.

The seat frame 1*b* is made on the one hand of a horizontal frame formed of two girders 13 parallel to the axis of symmetry of the seat and, on the other hand, of two vertical tubular standards 15 connected to said horizontal frame at their bases and equipped with removable and swivelling handles 16 at their top. As shown on FIG. 2, the seat proper is made by spreading cloths between standards 15 on the one hand and between girders 13 on the other hand. Moreover, it is to be noticed that hinged connections 17 on standards 15 allow the tilting of the seat-back in order to use the invalid chair in a relaxation position.

Of course, the chair as illustrated in FIG. 1 is only represented in order that the invention as well as the directions for use described hereinafter may be fully understood. So, it was thought useless to represent all the fittings usually found on a standard invalid chair, such as a foot-rest, a head-rest, an arm-rest, which will be possibly adapted on the chair which is the object of the invention.

Figure 2:
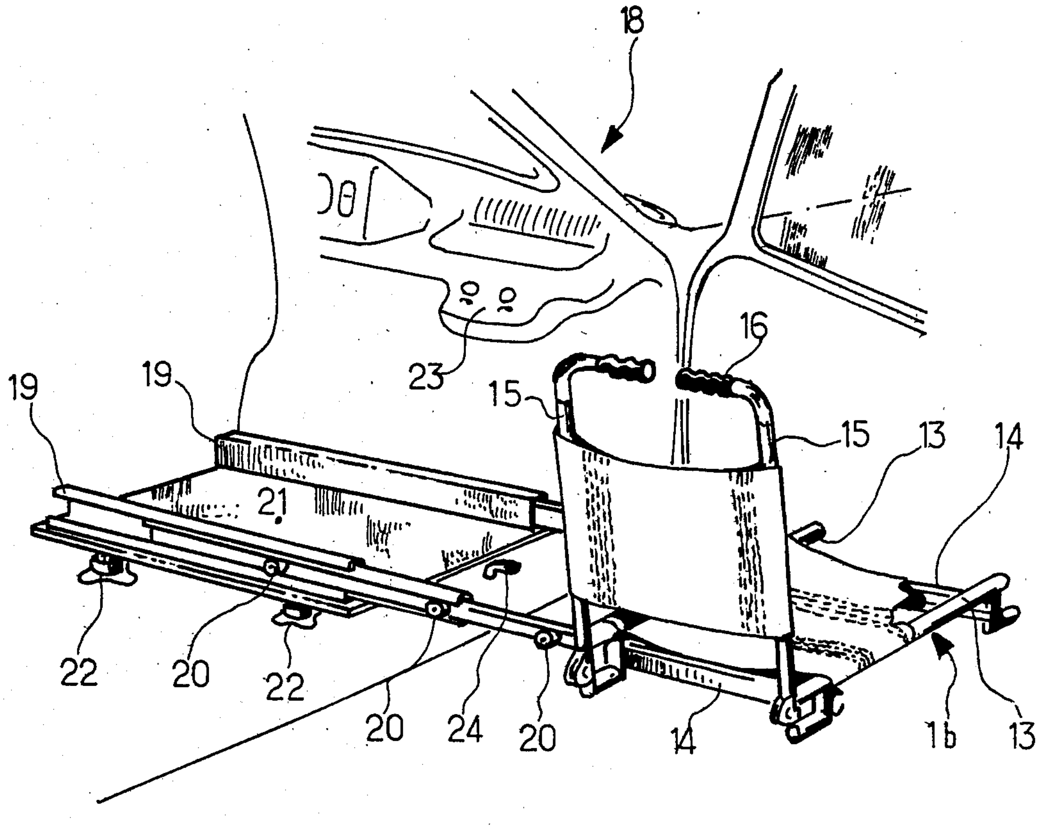
FIG. 2 is a perspective view partially exploded of the whole device after withdrawing the undercarriage from said chair.

FIG. 2 relates to the seat 1*b* hereabove described, ready for introduction into the motor vehicle 18. Said vehicle is equipped with a system of transfer of the seat, mainly constituted of a couple of parallel telescopic slippers 19 in three tiers, stretching out towards the outside of the vehicle, transversely with reference to its longitudinal axis. These slippers 19 are fitted with three carrying rollers 20 housed in slippers 14 of seat 1*b*.

These slippers 19 are fastened by means of four jacks 22 on a stage 21 laying on the body 18 of the vehicle. Only two jacks have been represented. The jacks are disposed at each of the four corners of the stage 21 and are operated together or separately, according to the more appropriate case for use, by means of an operating-board 23 within reach of occupant of the seat 1*b*. Said jacks are aimed both to direct stage 21, especially when the invalid chair and the vehicle are stopped on different ground levels, and to correct the height of slippers 19 to allow their correct introduction into slippers 14 of seat 1*b*.

Thus, after this introduction and rising stage 21, slippers 19 release seat 1*b* from undercarriage 1*a* ousting elements 12 from their guides 11. There is then nothing more to do, after moving back the bearing back-wheels 6 adjacent to the vehicle by moving their axes of rotation by extending slippers 8 and 9, and folding up the telescopic slippers on which seat 1*b* is fitted so that its occupant takes his place inside the vehicle.

Handles 16 have been especially set not to hinder the introduction of the seat inside the vehicle and a common locking mechanism 24 is provided to lock said seat once inserted.

It will be understood that different embodiments of the invention could have been represented herein. They have not been described as not bringing any more to the understanding of the invention. E.g., slippers 19 could directly lay on jack-tops 22, which would allow removal of stage 21.

What we claim is:

1. A device for transferring an invalid from an invalid chair to a motor vehicle, and conversely, while staying on a seat of the chair, said invalid chair being equipped with a removable seat mounted on an undercarriage provided with two bearing back-wheels and two steering front-wheels, and said vehicle being equipped with a pair of outwardly extensible and inwardly retractable arms, said arms being also vertically movable, wherein said pair of arms comprise two telescopic male slippers parallely fitted in a horizontal plane and movable in a backward and forward direction transverse to the longitudinal axis of the motor vehicle, said male slippers fitting inside two female slippers integral with the removable seat, in a plane perpendicular to the plane of symmetry of the invalid chair.

2. A device as set forth in claim 1, wherein said male slippers are fitted on a stage lying on the vehicle body by means of vertical jacks, said jacks being operable to effect the horizontality and the height of the plane of the stage, and the plane of the male slippers so as to allow the introduction of the ends of said male slippers into said female slippers.

3. A device as set forth in claim 1, wherein said male slippers are equipped with carrying rollers which are housed in the female slippers when said male slippers are fitted into said female slippers.

4. A device for transferring an invalid from an invalid chair to a motor vehicle, and conversely, by means of telescopic male slippers integral with the vehicle, said male slippers fitting in female slippers integral with a seat of the chair, said chair being equipped with back wheels movable to allow the sliding of said seat transversely to the longitudinal axis of said chair, and wherein the axes of rotation of said back wheels are mounted at the end of extensible arms, parallel to the plane of symmetry of said seat.

* * * * *